United States Patent [19]

Furst

[11] Patent Number: 6,003,996
[45] Date of Patent: Dec. 21, 1999

[54] CAP FOR EXTERNAL SIDE VIEW MIRROR OF A MOTOR VEHICLE

[75] Inventor: Peter Furst, Bürgstadt, Germany

[73] Assignee: Donnelly Hohe GmbH & Co. KG, Collenberg, Germany

[21] Appl. No.: 08/651,577

[22] Filed: May 22, 1996

[30] Foreign Application Priority Data

May 24, 1995 [DE] Germany ...................... 295 08 6211 U

[51] Int. Cl.$^6$ .............................. G02B 5/12; G02B 5/124
[52] U.S. Cl. ............................................ 359/549; 359/533
[58] Field of Search ..................... 359/530, 533, 359/548, 549, 550, 871; 362/83.1, 84

[56] References Cited

U.S. PATENT DOCUMENTS

| 2,200,168 | 5/1940 | Goldberg | 359/549 |
|---|---|---|---|
| 2,949,058 | 8/1960 | Daly | 359/549 |
| 3,266,371 | 8/1966 | Gunderson | 359/533 |
| 3,377,117 | 4/1968 | Biscow | 359/549 |
| 3,830,682 | 8/1974 | Rowland | 428/142 |
| 4,821,019 | 4/1989 | Taylor | 362/83.1 |
| 5,223,312 | 6/1993 | Langille | 428/31 |
| 5,303,130 | 4/1994 | Wei et al. | 362/83.1 |

FOREIGN PATENT DOCUMENTS

| 89 14 759.6 | 5/1991 | Germany . | |
|---|---|---|---|
| 94 09 566.3 | 9/1994 | Germany . | |
| 07108875 | 4/1995 | Japan . | |
| 0425138 | 3/1935 | United Kingdom | 359/533 |

*Primary Examiner*—Cassandra Spyrou
*Assistant Examiner*—Mark A. Robinson
*Attorney, Agent, or Firm*—Jacobson, Price, Holman & Stern, PLLC

[57] ABSTRACT

A cap for an external side view mirror for a motor vehicle which facilitates the ability of an observer to determine the position of the vehicle. To accomplish this, a light-reflecting strip or triangular pyramidal reflector prisms, for example, are applied to the cap.

7 Claims, 1 Drawing Sheet

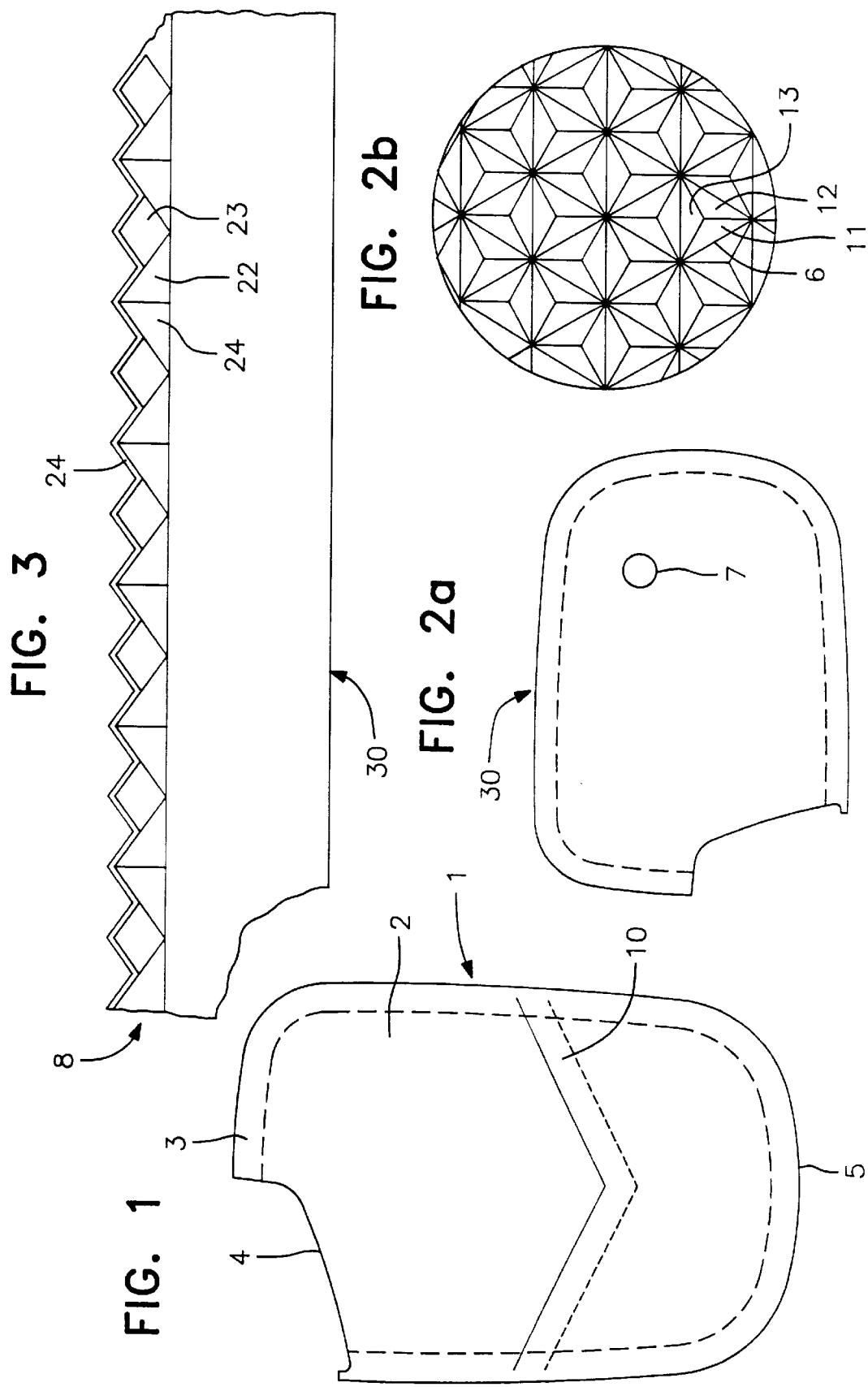

CAP FOR EXTERNAL SIDE VIEW MIRROR OF A MOTOR VEHICLE

FIELD OF THE INVENTION

The invention relates to a cap for an external mirror of a motor vehicle.

BACKGROUND OF THE INVENTION

A cap is known from Ger. Gbm. G 89 14 759.6 which can be slid into place (e.g. in plug fashion) over a stable mounting base on which a rear view mirror is mounted.

In Ger. Gbm. G 94 09 566.3 it is proposed to use a transparent or translucent cap. An illuminating device comprising light-emitting diodes or light reflective materials is provided inside of the external mirror device of the vehicle. This enables accurate determination of the position of a vehicle from an external vantage point, whether the vehicle is stationary or moving. Such a capability is particularly advantageous in the case of two moving vehicles which are approaching each other.

However, the described device is expensive; further, in present-day external mirrors having electrically adjustable mirror elements, the space available to accommodate such illuminating devices, which would be the space between the cap, the mounting base, and the mirror element, is inadequate.

Accordingly, the underlying problem of the present invention is to devise an uncomplicated arrangement whereby an observer can easily determine the position of a vehicle.

SUMMARY OF THE INVENTION

This problem is solved according to the present invention in that light-reflecting means are provided on the mirror cap. The invention enhances traffic safety in that even a dark-colored vehicle, equipped with the inventive cap, can be easily seen in the headlights of another vehicle. This is particularly important if the vehicle which is to be seen is parked in a dark area with its parking lights off.

According to a preferred embodiment of the invention, the entire mirror housing may be provided with a light-reflecting or fluorescing coating, whereby the vehicle is not only readily visible from the front but also at the side, in that laterally visible parts of the mirror housing surrounding the mirror element are also provided with the coating.

According to an alternative embodiment of the invention, a reflective surface device or a plurality of reflecting devices may be incorporated in the material of the housing, wherewith each such device has the structure of a "triple reflector", having the light back-reflecting characteristics of reflectors used in automobile rear light assemblies.

BRIEF DESCRIPTION OF THE DRAWINGS

The invention will be described in detail with reference to exemplary embodiments illustrated in the accompanying drawings.

FIG. 1 is a schematic representation of a mirror housing having reflector means on part of its surface;

FIG. 2a is a schematic representation of a second embodiment of the invention;

FIG. 2b is an enlarged view of a detail showing an array of "triple reflectors" as circled in FIG. 2a; and FIG. 3 is a schematic cross section through the mirror housing according to FIG. 2.

DETAILED DESCRIPTION OF THE PREFERRED EMBODIMENTS

FIG. 1 illustrates a front view of a side view mirror housing having a cap 1 having a convex main external surface 2 and a wrap-around edge 3. The cap 1 is designed to be fixed by clamp means to a mounting plate of the external mirror of a motor vehicle, by means of a catch finger formed on the inner side of the cap 1. When installed, the cap 1 forms part of the housing of the external mirror. The cutout region 4 in a corner of the cap 1 is fitted to the cover of the mounting base (not shown) of the mirror device, which base serves to mount the mirror device to the body of the vehicle.

The cap 1 is comprised of hard plastic material, painted to match the paint color of the vehicle body. At least one V-shaped strip 10 on the main external surface 2 of cap 1 is comprised of a light-reflecting material. Strip 10 extends over the entire width of surface 2. The apex of the "V" points away from the cutout region 4 and thus away from the vehicle when mounted on the vehicle. The light-reflecting coating of which the strip 10 is comprised may be of generally the same color as the coating of the rest of the cap, but the reflecting coating will contain a plurality of reflecting pellets or beads.

According to a second embodiment of the invention, the entire surface of the cap 1, including the main external surface 2 and the wrap-around edge region 3, is coated with a light-reflecting coating. With this arrangement, the reflector has the advantage of being produced from a large surface area. Further, the cap is rendered visible from the side at night, via reflection from the outer lateral edge region 5; thus the reflecting cap serves as a lateral visibility marker for a parked vehicle, for example. Alternatively, the coating on the main external surface 2 and (possibly) the edge region 5 may comprise a fluorescing paint.

According to a third embodiment of the invention, the mirror cap may be in the form of a complete reflector device, wherewith a high visibility optical reflector structure of generally known type (analogous to the familiar safety reflector) is configured as a cap for the mirror. The material of which the reflector device is comprised may be a suitable transparent or translucent plastic (e.g. a polycarbonate, polymethyl methacrylate, or polyamide), with fabrication by injection molding of a suitable molding compound, for example.

In the structure shown, a plurality of small triple reflectors (triangular pyramidal reflector prisms), each having three mutually perpendicular reflecting surfaces 21, 22, 23 (FIG. 3), are arrayed on the internal wall of the transparent or translucent mirror cap 30, whereby they cover the entire internal surface 8. The enlarged detail of only a representative section 7 of the inner surface in FIG. 2b shows the arrangement by which the entire inner surface 8 is covered with triple reflectors 6 comprised of individual mutually perpendicular surface elements 11, 12, 13 so that light passes into the transparent or translucent mirror cap 30 and is reflected by triple reflectors 6. The surface elements of the triple reflector are very smooth, providing the desired reflective characteristics.

A metallic coating 24 may be applied to the outer surfaces of the triple reflectors, further enhancing reflectivity of light passing into the reflectors and being reflected off of the coating 24. The coating may comprise electrolytically deposited chromium or vapor deposited aluminum. Such a coating may be applied to the entire surface 8 of the cap 30 having triple reflectors 6 or to only a part 7 of the surface, e.g. wherewith a small reflecting circle is applied to the outside of the cap 30.

I claim:

1. An external mirror for mounting to the side of a motor vehicle comprising a reflective mirror facing in a first direction and a convex cap forming a housing for the reflective mirror, the convex cap having an external main surface facing substantially in a second direction opposite to the first direction and having a wrap-around edge portion facing substantially laterally outwardly, the convex cap formed of a continuous hard plastic material having a color matching the color of the vehicle, wherein said external main surface of said convex cap includes a substantially "V" shaped light-reflecting surface with the apex of the "V" pointing away from the vehicle when the mirror is mounted to the side of the vehicle.

2. The external mirror of claim 1 wherein the light-reflecting surface is generally of the same color as the convex cap.

3. The external mirror of claim 2 wherein the light reflecting surface includes reflecting pellets.

4. An external mirror for mounting to the side of a motor vehicle comprising a reflective mirror facing in a first direction and a convex cap forming a housing for the reflective mirror, the convex cap having an external main surface facing substantially in a second direction opposite to the first direction and having a wrap-around edge portion facing substantially laterally outwardly, the convex cap formed of a continuous hard plastic translucent material covering triangular pyramidal reflecting prisms disposed on the entire internal wall of said convex cap.

5. The external mirror of claim 4 wherein said triangular pyramidal reflecting prisms are coated with a metallic coating.

6. The external mirror of claim 5 wherein the metallic coating is electrolytically deposited chromium.

7. The external mirror of claim 5 wherein the metallic coating is vapor-deposited aluminum.

* * * * *